Jan. 8, 1929.  F. DEUTSCH  1,698,538
CUTTER FOR TURNING POLYGONAL WORK
Filed Sept. 6, 1927  2 Sheets-Sheet 1

Inventor
Frank Deutsch

Jan. 8, 1929.
F. DEUTSCH
1,698,538
CUTTER FOR TURNING POLYGONAL WORK
Filed Sept. 6, 1927  2 Sheets-Sheet 2
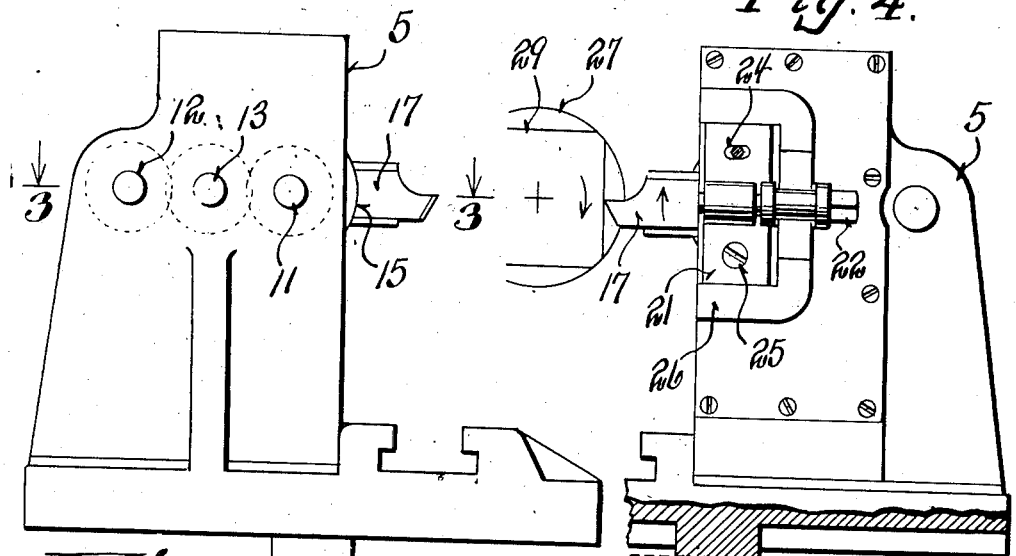
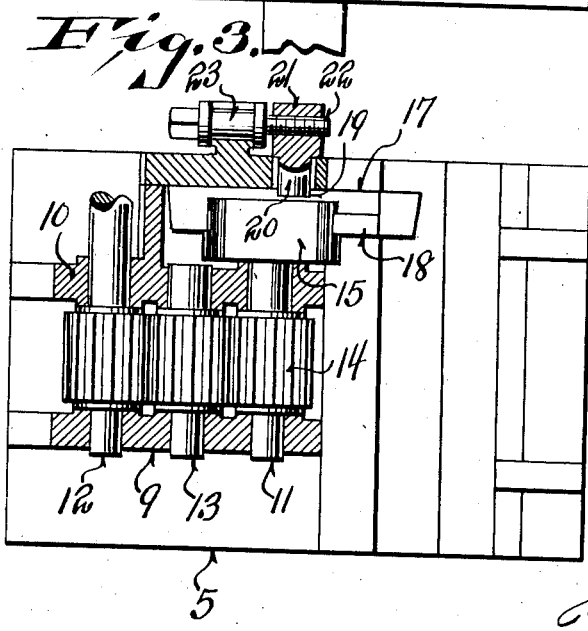
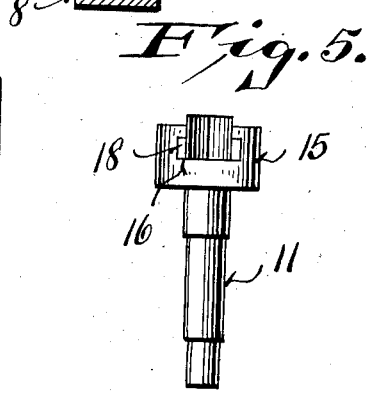
Inventor
Frank Deutsch Patented Jan. 8, 1929.

1,698,538

UNITED STATES PATENT OFFICE.

FRANK DEUTSCH, OF SOUTH MILWAUKEE, WISCONSIN.

CUTTER FOR TURNING POLYGONAL WORK.

Application filed September 6, 1927. Serial No. 217,712.

This invention relates to cutters and is particularly directed to a rotary cutter associated with means for rotating the work, such, for example, as a lathe.

Objects of this invention are to provide a novel form of cutter which may be carried by the usual traveling slide upon a lathe, and may be substituted for the tool holder or other attachment, and which is so constructed that it will cut a square shank in the work while the work is rotated by the lathe or other rotary means and without removing the work from the rotary means.

Further objects are to provide a cutter which is a unitary structure and is adapted to be driven by the universal driving shaft of a lathe or similar work rotating machine, which is equipped with a reciprocating rotating cutter cooperating with the rotated work to form flat faces, and which is so made that the device may be adjusted to compensate for the wear of the cutter and maintain the flat cut irrespective of the wear.

An embodiment of the invention is shown in the accompanying drawings in which:

Figure 2 is an end elevation;

Figure 3 is a sectional view on the line 3—3 of Figure 2;

Figure 4 is a view corresponding to Figure 2 and partly in section, but taken from the other side of the device from that shown in Figure 2;

Figure 5 is a detail of the cutter and the cutter carrying member;

Figure 1:
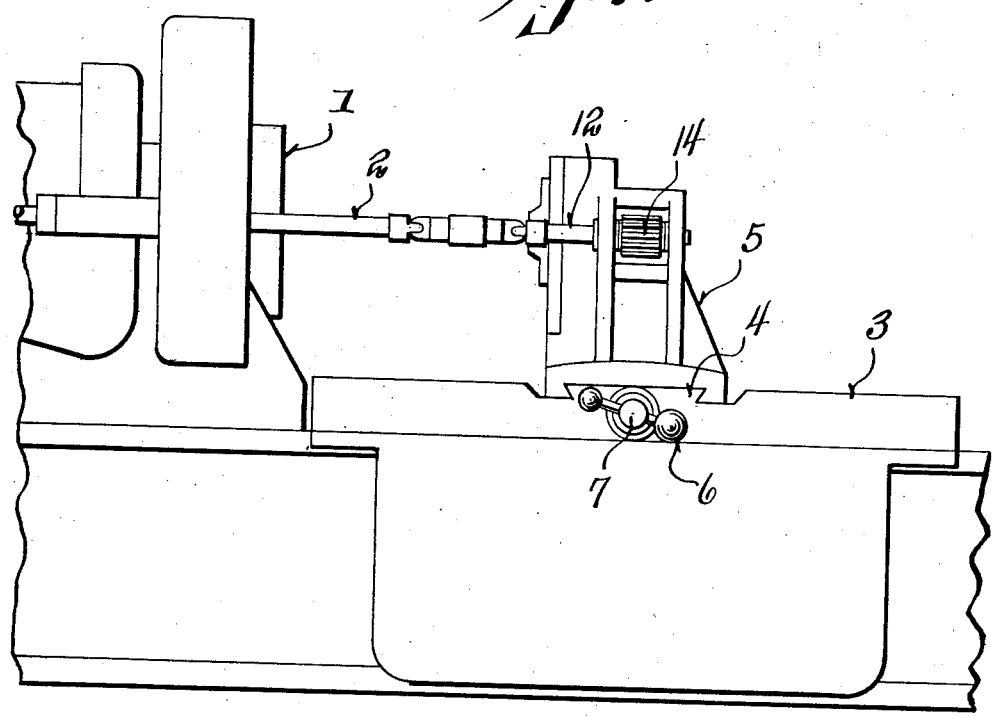
Figure 1 is a side elevation of the device showing it mounted on the lathe.

Referring to the drawings, it will be seen that a lathe has been illustrated as provided with a work holding member, such as a face plate, chuck, or other means, as indicated by the reference character 1, and as provided with a universal driving shaft 2 of the usual construction. The lathe is provided with a traveling carriage 3 equipped with guides 4, as in the usual construction. Upon these guides, an auxiliary transversely adjustable carriage 5 is positioned, as shown in Figure 1, and is adapted to be advanced by means of the hand crank 6 connected to the shaft 7. The shaft 7, it will be noted from Figure 4 is screw threaded and engages the lug 8 of the auxiliary carriage or cutter carriage 5.

The cutter carriage 5 is provided with uprights 9 and 10 within which the cutter shaft 11, the driving shaft 12, and the jack shaft 13, are journalled. These shafts are each provided with gears 14 so that power may be transmitted from the shaft 12 to the shaft 11, the shaft 12, as may be seen from Figure 1, being operatively connected to the universal jack shaft, or auxiliary shaft 2. The shaft 11 is provided with an integral head 15 (see Figures 3, 5, 6, and 7) and this head 15 is slotted to provide a T-shaped slot 16 extending diametrically thereacross. Within this T-shaped slot, a cutter 17 is slidably mounted. The cutter is provided with flanges 18 which interlock with the slot and hold the cutter accurately in position against axial motion with reference to the shaft 11. However, it will be noted that the cutter is free to move diametrically back and forth across the cutter head 15 as the shaft 11 rotates.

In order to secure this reciprocation of the cutter, it is provided with a slot 19 within which a pin 20 is received. This pin 20 is integral with a small adjusting block 21 which is adjusted by means of a screw 22 passing through a lug 23 carried by the cutter carriage 5, as shown most clearly in Figures 3 and 4. Preferably, the block or small cross head 21 is provided with elongated slots 24 through which clamping screws 25 pass. After this block 21 has been adjusted by means of the screw 22 to the desired position, the screws 25 are tightened to thus lock the head in position. The adjustment of the block 21 or cross head may be very slight, as it is used for taking up wear as the cutter is ground down. Obviously, however, any degree of motion may be permitted by suitably designing the parts. Preferably, the cross head 21 is carried between guides 26 formed integrally with the cutter carriage 5, as shown in Figure 4.

It is to be noted particularly that the pin 20 is an eccentric pin with reference to the cutter shaft 11, so that it is spaced off center a predetermined amount.

Figure 6:
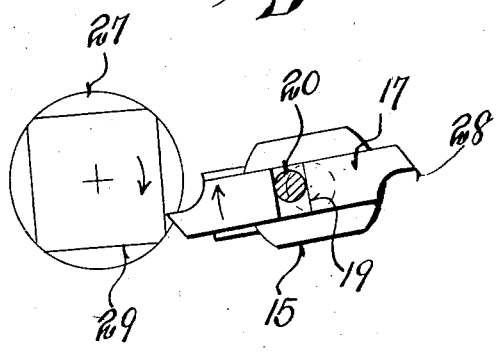
Figure 6 is a diagrammatic view showing the cutter in one position.
Figure 7:
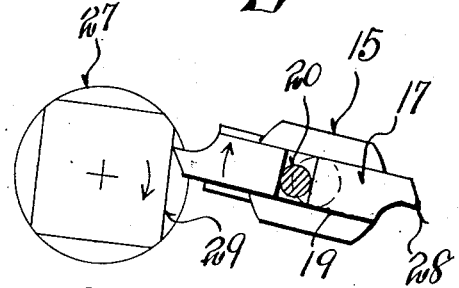
Figure 7 is a similar view to Figure 6 showing the cutter in another position.

Referring to Figures 6 and 7, it will be seen that as the work, for instance, the round stock 27 rotates, the cutter head 15 also rotates and in a reverse direction. The drive of the auxiliary shaft 2 is such that the cutter executes two revolutions for each revolution of the work. The cutter 17 is provided with cutting edges 28 arranged on a diametrical line passing through the center of the cutter head 15, as may be seen from Figures 6 and 7. As the cutter head rotates, the cutter is moved in and out, or, in other words, reciprocated diametrically with respect to the cutter head. This forms straight cuts across the rotating work and produces the flat faces 29, as shown in Figures 6 and 7. The cutter is moved out its maximum amount when the axis thereof is horizontal and is gradually retracted as it is further rotated, so that it cooperates with the rotating work to form the four flat faces at right angles to each other, thus forming a square shank on the work in an automatic manner. It is apparent that after the proper adjustment of the eccentric pin 20 has been obtained by means of the screw 22 that the cutter will cut the faces at any desired distance from the center of rotation of the work 27. It may be moved in and out by means of the hand crank 6 without any other effort on the part of the operator, the cutter operating in a wholly automatic manner to form the flat faces.

It will be seen that it is not necessary to remove the work from the machine but that it may be turned and while still in place the flat or square shank may be formed thereon.

It will thus be seen that a rotary and reciprocatory cutter has been provided by this invention which cooperates with the rotating work in a novel manner to produce a square shank.

It will be seen further that as the cutter wears due to successive sharpenings, that the screw 22 may be adjusted to compensate for the wear, such screw being employed to move the cutter towards the work as the cutter is ground away in sharpening.

Although the invention has been described in considerable detail, such description is intended as illustrative rather than limiting as the invention may be variously embodied and as the scope of such invention is to be determined as claimed.

I claim:

1. In a device of the class described, the combination of means for rotating work, a rotary cutter head driven from said means and having a diametrically positioned guide, a cutter slidably carried by said guide, and a pin mounted eccentrically with reference to the axis of rotation of said cutter head and cooperating with said cutter to reciprocate such cutter as said head rotates.

2. The combination of means for rotating work, a rotary cutter head driven from said means and having a diametrically positioned slot, a cutter mounted for reciprocation within said slot and having a transverse slot formed in the body of the cutter, and a pin mounted eccentrically with reference to the axis of rotation of said cutter head and positioned within said last mentioned slot.

In testimony that I claim the foregoing I have hereunto set my hand at South Milwaukee, in the county of Milwaukee and State of Wisconsin.

FRANK DEUTSCH.